(12) United States Patent
Toth et al.

(10) Patent No.: US 9,334,960 B2
(45) Date of Patent: May 10, 2016

(54) PISTON RING WITH A WEAR-RESISTANT COBALT COATING

(71) Applicant: Federal-Mogul Corporation, Southfield, MI (US)

(72) Inventors: James R. Toth, Ann Arbor, MI (US); Mitchell T. Marsh, Saline, MI (US)

(73) Assignee: Federal-Mogul Corporation, Southfield, MI (US)

(*) Notice: Subject to any disclaimer, the term of this patent is extended or adjusted under 35 U.S.C. 154(b) by 404 days.

(21) Appl. No.: 13/673,546

(22) Filed: Nov. 9, 2012

(65) Prior Publication Data
US 2013/0113164 A1 May 9, 2013

Related U.S. Application Data

(60) Provisional application No. 61/557,589, filed on Nov. 9, 2011.

(51) Int. Cl.
*F16J 9/26* (2006.01)
*C25D 7/04* (2006.01)

(52) U.S. Cl.
CPC .... *F16J 9/26* (2013.01); *C25D 7/04* (2013.01)

(58) Field of Classification Search
CPC .......................................................... F16J 9/26
USPC .................................................. 277/440–444
See application file for complete search history.

(56) References Cited

U.S. PATENT DOCUMENTS

| | | | | |
|---|---|---|---|---|
| 2,643,221 A | * | 6/1953 | Brenner et al. | 205/258 |
| 2,882,190 A | * | 4/1959 | Thomson et al. | 419/28 |
| 3,979,534 A | * | 9/1976 | Rairden, III | 427/405 |
| 4,101,714 A | * | 7/1978 | Rairden, III | 428/639 |
| 4,212,602 A | * | 7/1980 | Buran et al. | 418/178 |
| 4,420,543 A | | 12/1983 | Kondo et al. | |
| 4,681,817 A | | 7/1987 | Shinada | |
| 4,876,158 A | * | 10/1989 | Onuki et al. | 277/444 |
| 5,316,321 A | * | 5/1994 | Ishida et al. | 277/443 |
| 5,601,933 A | * | 2/1997 | Hajmrle et al. | 428/660 |
| 5,660,399 A | | 8/1997 | Atmur et al. | |
| 5,743,012 A | * | 4/1998 | Adams et al. | 29/888.043 |

(Continued)

FOREIGN PATENT DOCUMENTS

| | | |
|---|---|---|
| CN | 1210770 A | 3/1999 |
| CN | 101165198 A | 4/2008 |

(Continued)

OTHER PUBLICATIONS

International Search Report PCT/US2012/064033 mailed on Feb. 13, 2013.

*Primary Examiner* — Kristina Fulton
*Assistant Examiner* — Nicholas L Foster
(74) *Attorney, Agent, or Firm* — Robert L. Stearns; Dickinson Wright, PLLC

(57) ABSTRACT

A piston ring is provided having a bottom surface, a top surface, an inner diameter surface and at least one running surface. A wear protection coating substantially entirely of cobalt is applied to the at least one running surface to protect the base material of the piston ring. Specifically, during operation of an engine, the more durable cobalt wear resistant coating, not the base material which may be steel or cast iron, is in sliding contact with a cylinder wall. The cobalt coating may be applied through, for example, electrodeposition or plasma spraying.

12 Claims, 2 Drawing Sheets

(56) References Cited

U.S. PATENT DOCUMENTS

| | | |
|---|---|---|
| 5,794,943 A | 8/1998 | Atmur et al. |
| 5,955,151 A * | 9/1999 | Hajmrle et al. ............... 427/456 |
| 6,060,182 A * | 5/2000 | Tanaka et al. ................ 428/698 |
| 7,891,669 B2 | 2/2011 | Araujo et al. |
| 2009/0020638 A1* | 1/2009 | Becker et al. ................ 241/291 |
| 2009/0174150 A1 | 7/2009 | Smith et al. |
| 2010/0304179 A1 | 12/2010 | Facchini et al. |
| 2012/0082541 A1* | 4/2012 | Macchia et al. ............. 415/200 |
| 2013/0180494 A1* | 7/2013 | Aharonov et al. ......... 123/193.6 |

FOREIGN PATENT DOCUMENTS

| | | |
|---|---|---|
| DE | 3444456 C1 | 12/1985 |
| DE | 3802920 C1 | 5/1989 |
| GB | 2193786 A | 2/1988 |
| JP | S5776363 A | 5/1982 |
| JP | 2-085571 A | 3/1990 |
| JP | 2-089874 A | 3/1990 |
| JP | 5-302674 A | 11/1993 |
| JP | 200364463 A | 3/2003 |

* cited by examiner

PISTON RING WITH A WEAR-RESISTANT COBALT COATING

CROSS-REFERENCE TO RELATED APPLICATION

This patent application claims the benefit of U.S. Provisional Patent Application Ser. No. 61/557,589, entitled "Piston Ring with a Wear-Resistant Cobalt Coating", filed on Nov. 9, 2011, the entire disclosure of the application being considered part of the disclosure of this application and hereby incorporated by reference.

BACKGROUND OF THE INVENTION

1. Field of the Invention

The invention relates to piston rings, and more precisely, to piston rings for internal combustion engines and methods of forming the same.

2. Related Art

Recent development of internal combustion engines has resulted in increased compression pressures within the combustion chamber of engines and increased engine speeds. As a consequence, the piston rings on the pistons of such engines are rubbed more forcefully against the cylinder walls of the engine, which could result in excessive wear occurring on the exterior of an unprotected piston ring thereby leading to a weaker seal between the piston and the cylinder wall.

Piston rings for internal combustion engines are typically formed of cast iron or steel materials. One process for reinforcing a cast iron or steel ring is to apply a layer of pure chromium around at least the outer diameter surface of the piston ring. This is advantageous because the chromium directly engages the cylinder wall and protects the cast iron or steel from rubbing or sliding contact with the cylinder wall. Another known process is to apply a layer of less than 70 wt. % cobalt and the remainder of chromium onto the outer diameter surface of piston rings. In such coatings, the chromium provides the primary wear protection, and the cobalt acts as a binder for the chromium.

SUMMARY OF THE INVENTION

According to one aspect of the invention, a piston ring is provided including a bottom surface, a top surface, an inner diameter surface and at least one running surface. A wear protection coating substantially entirely of cobalt applied to the at least one running surface. The more durable cobalt wear protection surface protects the base material of the piston ring from sliding contact with a cylinder wall during operation of the engine, thereby improving the life of the piston ring. Additionally, the cobalt wear protection coating has been shown to substantially reduce the amount of oil that is able to flow pass the piston ring as compared to uncoated piston rings or piston rings with other types of coatings. As such, the piston ring constructed according to this aspect of the invention provides improved performance as compared to other known piston rings.

Another aspect of the present invention is a method of making a piston ring. The method includes the step of preparing a piston ring having a bottom surface, a top surface, an inner diameter surface and at least one running surface. The method proceeds with the step of applying a coating substantially entirely of cobalt onto the at least one running surface of the piston ring. The cobalt wear protection coating may be applied, for example, through electrodeposition or through plasma spraying. Either of these processes is not costly, and therefore, the improved performance of the cobalt wear protection coating is gained cost effectively.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
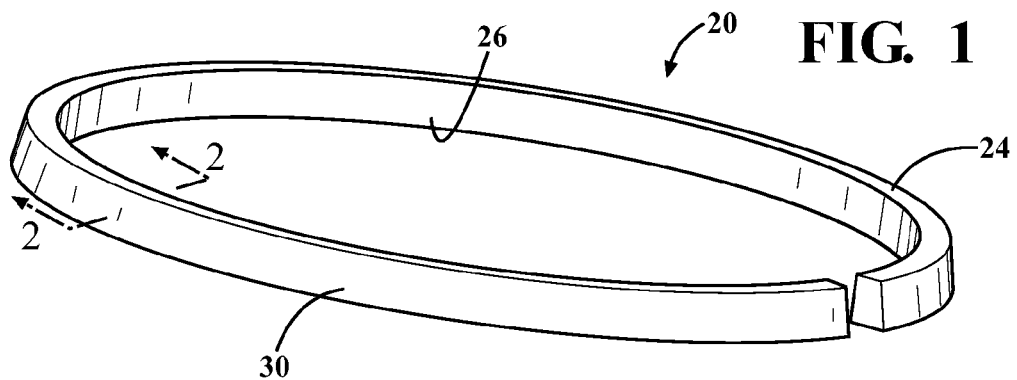
FIG. 1 is a perspective view of a first exemplary piston ring.
Figures 2, 3:
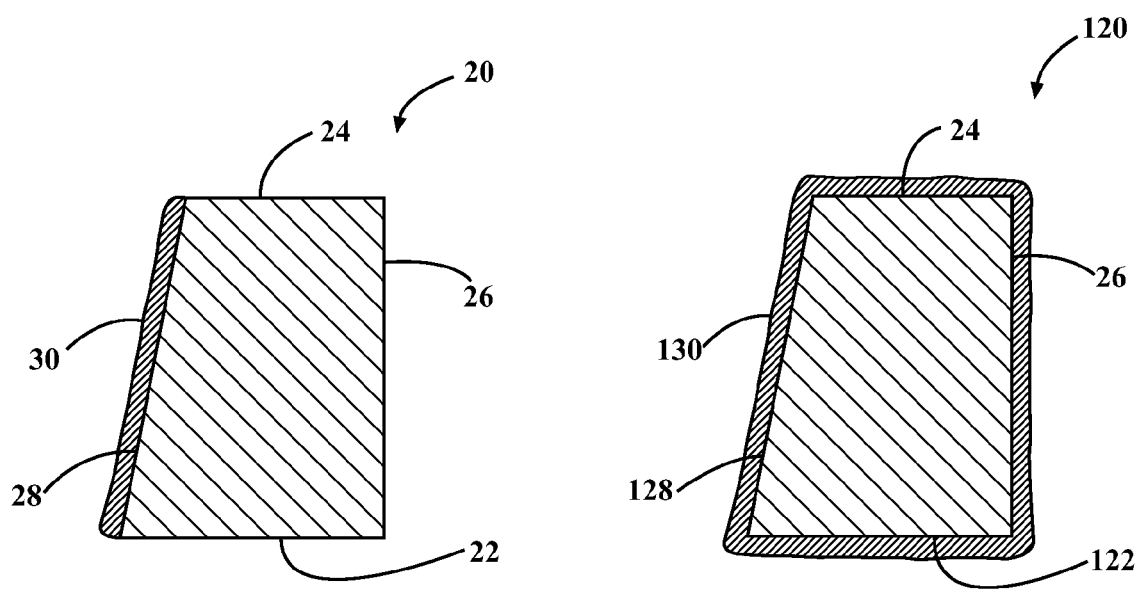
FIG. 2 is a cross-sectional view of the first exemplary piston ring taken along line 2-2 of FIG. 1.
FIG. 3 is a cross-sectional view of a second exemplary piston ring.
Figure 4A:
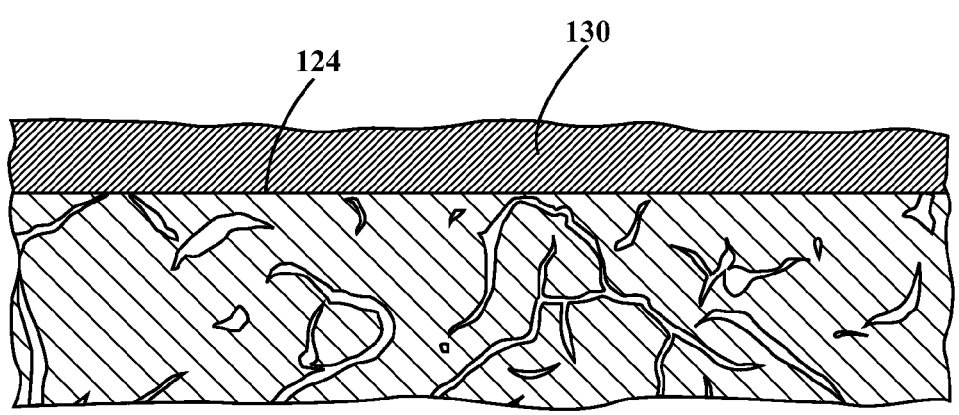
FIGS. 4a-d are enlarged cross-sectional views of the second exemplary piston ring taken along the top side, left side, right side and bottom side respectively.
Figure 4B:
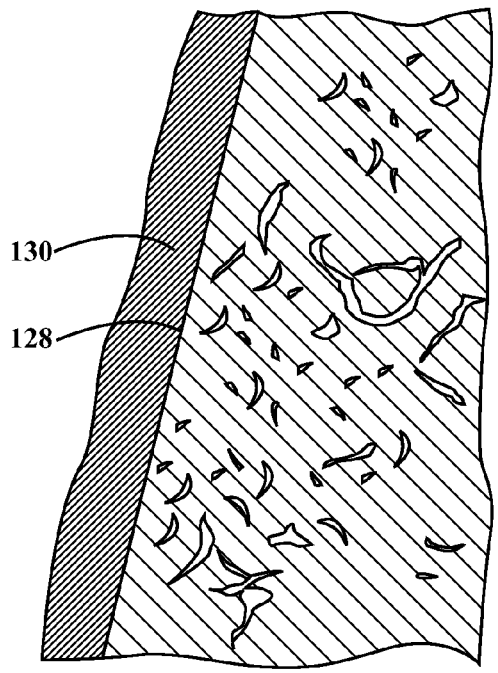
Figure 4C:
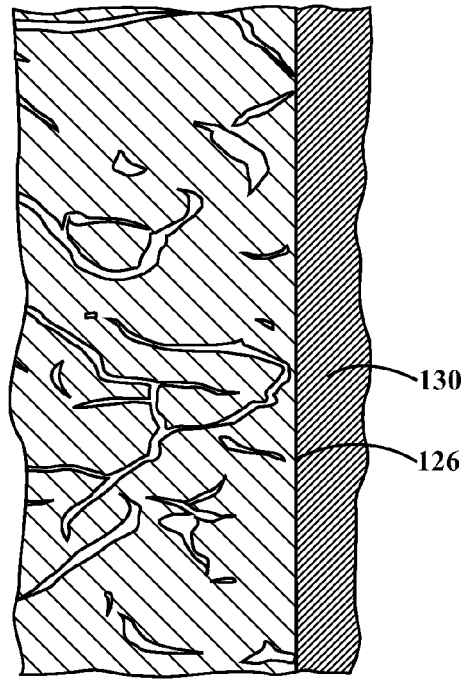
Figure 4D:
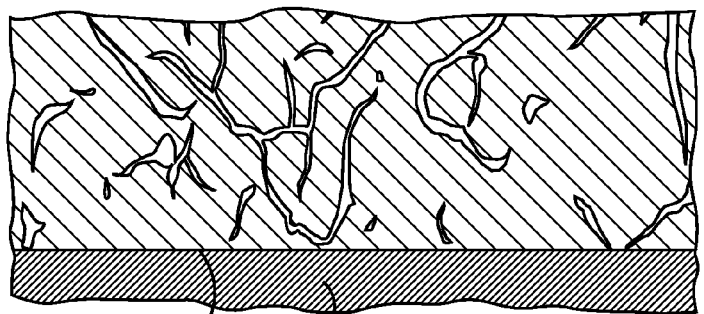
Figure 5:
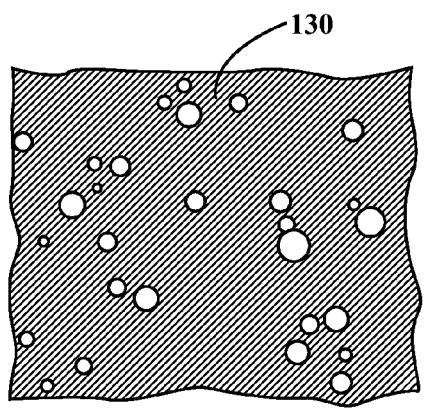
FIG. 5 is an enlarged cross-sectional view of a test sample taken of the coating on the second exemplary piston ring.

Referring to the Figures, wherein like numerals indicate corresponding parts throughout the several views, a first exemplary embodiment of a piston ring 20 constructed according to an aspect of the present invention is generally shown in FIG. 1. As shown, the exemplary piston ring 20 has a bottom surface 22, a top surface 24, an inner diameter surface 26 and an outer diameter surface (hereinafter referred to as a "running surface 28"). The base material of the piston ring 20 is preferably steel or cast iron but any other suitable material may be employed, and the piston ring 20 is preferably shaped through machining but may be shaped through any suitable process. As with conventional piston rings, when properly installed on a piston (not shown) within a cylinder bore (not shown) of an internal combustion engine (not shown), the inner diameter surface 26 of the piston ring 20 seals against a groove in the piston, and the running 28 slidably contacts an inner surface of the cylinder wall, thus providing a gas-tight seal between the piston and the cylinder wall. The exemplary piston ring 20 is a compression ring with a taper faced shape, i.e. the outer diameter surface 28 is tapered. However, it should be appreciated that the piston ring 20 could be a scraper ring, an oil control ring or any desirable type of piston ring and could have a range of different shapes.

The first exemplary piston ring 20 additionally includes a wear protection coating 30 that is substantially entirely of cobalt and is disposed along substantially only along the running surface 28 for protecting the base material of the piston ring 20 during operation of the engine. The cobalt coating 30 is disposed along the entire circumference of the piston ring 20 to protect the base material of the piston ring 20 from the cylinder wall. As such, the life of the piston ring 20 is increased because it is the more durable cobalt coating 30 which is in rubbing or sliding contact with the cylinder wall during operation of the engine rather than the base material of the piston ring 20. Testing of the first exemplary embodiment of the piston ring 20 in an engine has resulted in an unexpectedly low oil consumption rate of less than 0.02 ounces of oil per hour, which is substantially lower than comparable uncoated piston rings or piston rings with other coatings.

Because the cobalt coating 30 is disposed substantially only along the running face 28, the material costs of the cobalt coating 30 are minimized. Additionally, only locating the cobalt coating 30 along the running surface 28 may allow for certain manufacturing advantages because it may be applied to many piston rings 20 simultaneously by stacking the piston rings 20 on top of one another and electroplating or spraying their running faces 28 all at once.

The cobalt coating 30 is preferably substantially of pure cobalt and preferably has a generally uniform thickness of between eight and twelve microns (8-12 μm) and is most preferably approximately 10 microns (10 μm). Testing data of engines with cobalt coated piston rings 20 with a 10 μm thick coating 30 have yielded extremely low wear and oil consumption rates. However, it should be appreciated that the cobalt coating 30 could have any desirable thickness.

A second exemplary piston ring 120 constructed according to this aspect of the present invention is generally shown in FIGS. 3-8 with the same reference numerals, offset by a factor of 100, being used to identify similar features as discussed above. The second exemplary embodiment of the piston ring 120 is distinguished from the first exemplary embodiment discussed above by the cobalt coating 130 being applied to the bottom, top and inner diameter surfaces 122, 124, 126 in addition to the running surface 128.

After the first exemplary piston ring is shaped, to give the base material has a predetermined microstructure. After the heat treating process is completed, the piston ring 20 is coated with a wear protection coating 30 that is substantially entirely of cobalt along substantially only it's running surface 28.

Another aspect of the present invention provides for a method of making a piston ring 20, such as the first exemplary embodiment discussed above. The method starts with the step of preparing a piston ring 20 having a bottom surface 22, a top surface 24, an inner diameter surface 26 and at least one running surface 28. The piston ring 20 could be, for example, a compression ring, a scraper ring or an oil control ring, could have any desirable shape and could be shaped through any suitable shaping process.

The method continues with the step of applying a wear protection coating 30 substantially entirely of cobalt onto the at least one running surface 28 of the piston ring 20. The method may additionally including the step of applying the coating 30 onto one or more of the bottom, top and inner diameter surfaces 22, 24, 26 in addition to the running surface 28. In one embodiment, the applying step is further defined as electrodepositing the coating 30 onto the piston ring 20. During the electroplating process, the base material of the piston ring 20 is negatively charged and submerged in a positively charged cobalt electrolyte which causes a bond to form between the cobalt and the base material. This electrodepositing process has been found to provide a coating 30 with a sufficiently uniform thickness across the area to be coated. According to another embodiment, the applying step is further defined as plasma spraying the coating 30 onto the piston ring 20.

Obviously, many modifications and variations of the present invention are possible in light of the above teachings and may be practiced otherwise than as specifically described while within the scope of the appended claims.

What is claimed is:

1. A piston ring, comprising:
    a bottom surface, a top surface, an inner diameter surface and at least one running surface; and
    a wear protection coating applied to said at least one running surface, wherein said wear protection coating consists essentially of pure cobalt.

2. The piston ring as set forth in claim 1 wherein said wear protection coating is applied to substantially only said at least one running surface.

3. The piston ring as set forth in claim 1 wherein said wear protection coating is applied to at least one of said bottom, top and inner diameter surfaces in addition to said running surface.

4. The piston ring as set forth in claim 3 wherein said wear protection coating is applied to all of said bottom, top, inner diameter and running surfaces.

5. The piston ring as set forth in claim 1 wherein the entirety of said wear protection coating has a thickness of between 8 and 12 microns.

6. The piston ring as set forth in claim 5 wherein the entirety of said wear protection coating has a thickness of approximately 10 microns.

7. A method of making a piston ring, comprising the steps of:
    preparing a piston ring having a bottom surface, a top surface, an inner diameter surface and at least one running surface; and
    applying a wear protection coating onto the at least one running surface of the piston ring, wherein the wear protection coating consists essentially of pure cobalt.

8. The method as set forth in claim 7 wherein said step of applying the wear protection coating is further defined as electrodepositing the wear protection coating onto the at least one running surface of the piston ring.

9. The method as set forth in claim 7 further including the step of applying the wear protection coating onto at least one of the bottom, top and inner diameter surfaces in addition to the at least one running surface.

10. The method as set forth in claim 7 further including the step of applying the wear protection coating onto all of the bottom, top, inner diameter and running surfaces.

11. The method as set forth in claim 7 wherein the entirety of the wear protection coating is applied to a thickness of between 8 and 12 microns.

12. The method as set forth in claim 11 wherein the entirety of the wear protection coating is applied to a thickness of approximately 10 microns.

* * * * *